US006951096B2

(12) United States Patent
Maguire et al.

(10) Patent No.: US 6,951,096 B2
(45) Date of Patent: Oct. 4, 2005

(54) METHOD AND APPARATUS FOR INSTALLING LINKS ON AN ENDLESS TRACK CHAIN

(75) Inventors: Roy L. Maguire, Edelstein, IL (US); James A. Huenefeld, Chillicothe, IL (US); Darryl J. Brincks, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 48 days.

(21) Appl. No.: 10/153,025

(22) Filed: May 21, 2002

(65) Prior Publication Data

US 2003/0217454 A1 Nov. 27, 2003

(51) Int. Cl.[7] ................................................. B21L 9/06
(52) U.S. Cl. ............................... 59/7; 269/43; 269/95; 269/104
(58) Field of Search .................... 59/7, 8, 35.1; 269/43, 269/95, 104

(56) References Cited

U.S. PATENT DOCUMENTS

| 2,917,893 | A | * | 12/1959 | Kausche ............................ 59/7 |
| 2,964,902 | A | * | 12/1960 | Carlton et al. .................... 59/7 |
| 3,028,723 | A | * | 4/1962 | Kaplan et al. .................... 59/7 |
| 3,075,346 | A | * | 1/1963 | Quarve et al. .................... 59/7 |
| 3,097,477 | A | * | 7/1963 | Rodgers ........................... 59/7 |
| 3,099,130 | A | * | 7/1963 | Pahl ................................. 59/7 |
| 3,711,928 | A | | 1/1973 | Boggs |
| 3,903,688 | A | * | 9/1975 | Robinson .......................... 59/7 |
| 4,005,945 | A | * | 2/1977 | Gutman .................. 408/115 B |
| 4,030,286 | A | * | 6/1977 | Gibilaro ........................... 59/7 |
| 4,083,611 | A | | 4/1978 | Schaffner et al. |
| 4,187,744 | A | | 2/1980 | Livesay |
| 4,258,463 | A | | 3/1981 | Lindquist |
| 4,339,961 | A | * | 7/1982 | Grillot et al. ................. 74/110 |
| 4,341,375 | A | * | 7/1982 | Romanin ....................... 269/43 |
| 4,423,910 | A | | 1/1984 | Narang |
| 4,429,525 | A | * | 2/1984 | Doak ................................ 59/7 |
| 4,506,501 | A | * | 3/1985 | DeVall et al. .................... 59/7 |
| 4,530,546 | A | | 7/1985 | Meisel, Jr. |
| 4,553,791 | A | | 11/1985 | Blair |
| 4,570,436 | A | * | 2/1986 | Wilkie ............................. 59/7 |
| 4,579,394 | A | | 4/1986 | Bedis et al. |
| 4,612,765 | A | | 9/1986 | Livesay |
| 4,636,014 | A | | 1/1987 | Dennison et al. |
| 4,650,379 | A | * | 3/1987 | Jaskolski ..................... 409/220 |
| 4,766,720 | A | * | 8/1988 | Martin ............................. 59/7 |
| 4,775,198 | A | | 10/1988 | Bokamp et al. |
| 4,833,875 | A | * | 5/1989 | Buermann et al. ............... 59/7 |
| 5,214,907 | A | * | 6/1993 | Livesay et al. .................. 59/7 |
| 5,214,908 | A | | 6/1993 | Livesay et al. |
| 5,214,909 | A | | 6/1993 | Livesay et al. |
| 5,222,354 | A | * | 6/1993 | Rothstein ......................... 59/7 |
| 5,307,618 | A | | 5/1994 | Livesay et al. |
| 5,330,167 | A | * | 7/1994 | Plumb ......................... 269/43 |
| 5,595,378 | A | * | 1/1997 | Martinsson et al. ........ 269/210 |
| 5,787,701 | A | * | 8/1998 | Small ............................... 59/7 |
| 6,000,688 | A | * | 12/1999 | Giangrasso .................. 269/43 |
| 6,029,342 | A | * | 2/2000 | Armenoff et al. ............. 29/791 |
| 6,270,173 | B1 | * | 8/2001 | Hashimoto et al. ......... 305/202 |
| 6,453,657 | B1 | * | 9/2002 | Teravainen ..................... 59/7 |

* cited by examiner

*Primary Examiner*—Essama Omgba
(74) *Attorney, Agent, or Firm*—Tom Derry; Jeff A Greene; J. W. Burrows

(57) ABSTRACT

The present invention provides a portable machine for assembling a track for a track type work machine. A positioning block is provided for alignment of a pair of track pins that are to receive an outer track joint. A portable assembly tool having a pair of contact tools is adapted to receive a pair of outer track joints. The assembly tool is positioned over the positioning block and a hydraulic ram is extended to press each of the outer track links onto the track pins. The present invention is used with track assemblies that do not require master links.

11 Claims, 5 Drawing Sheets

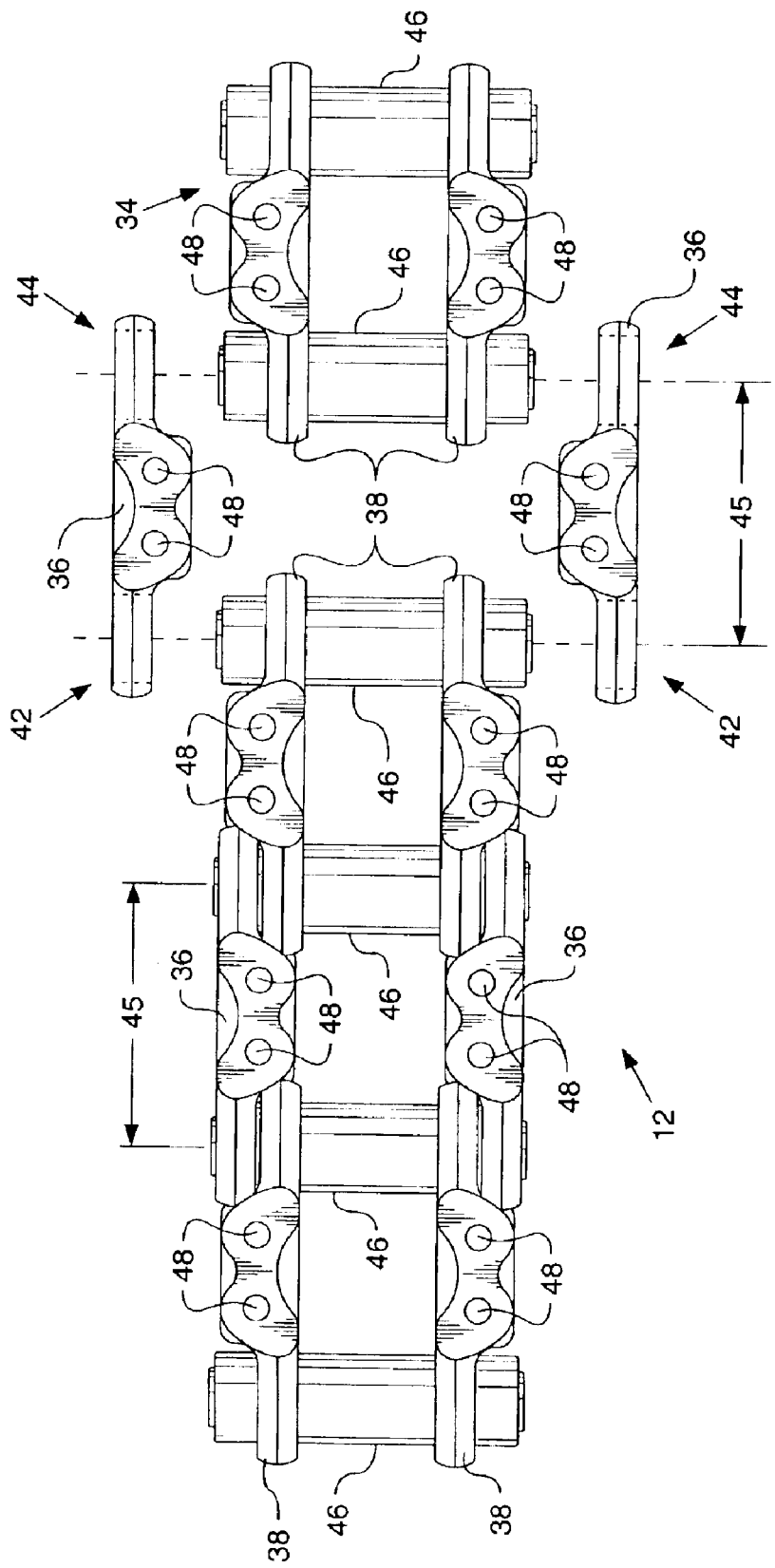

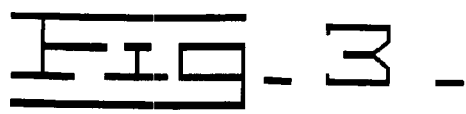
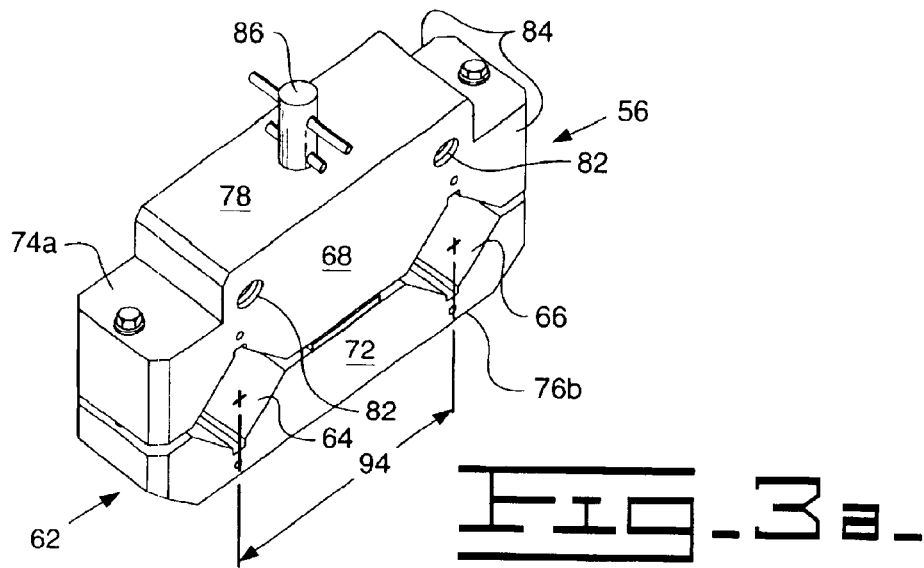
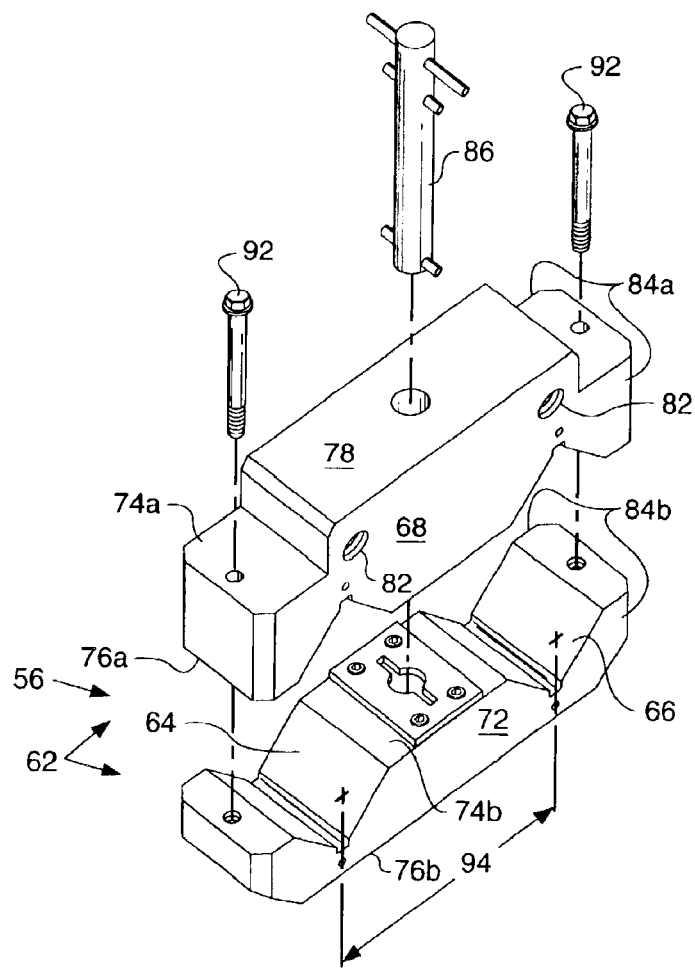

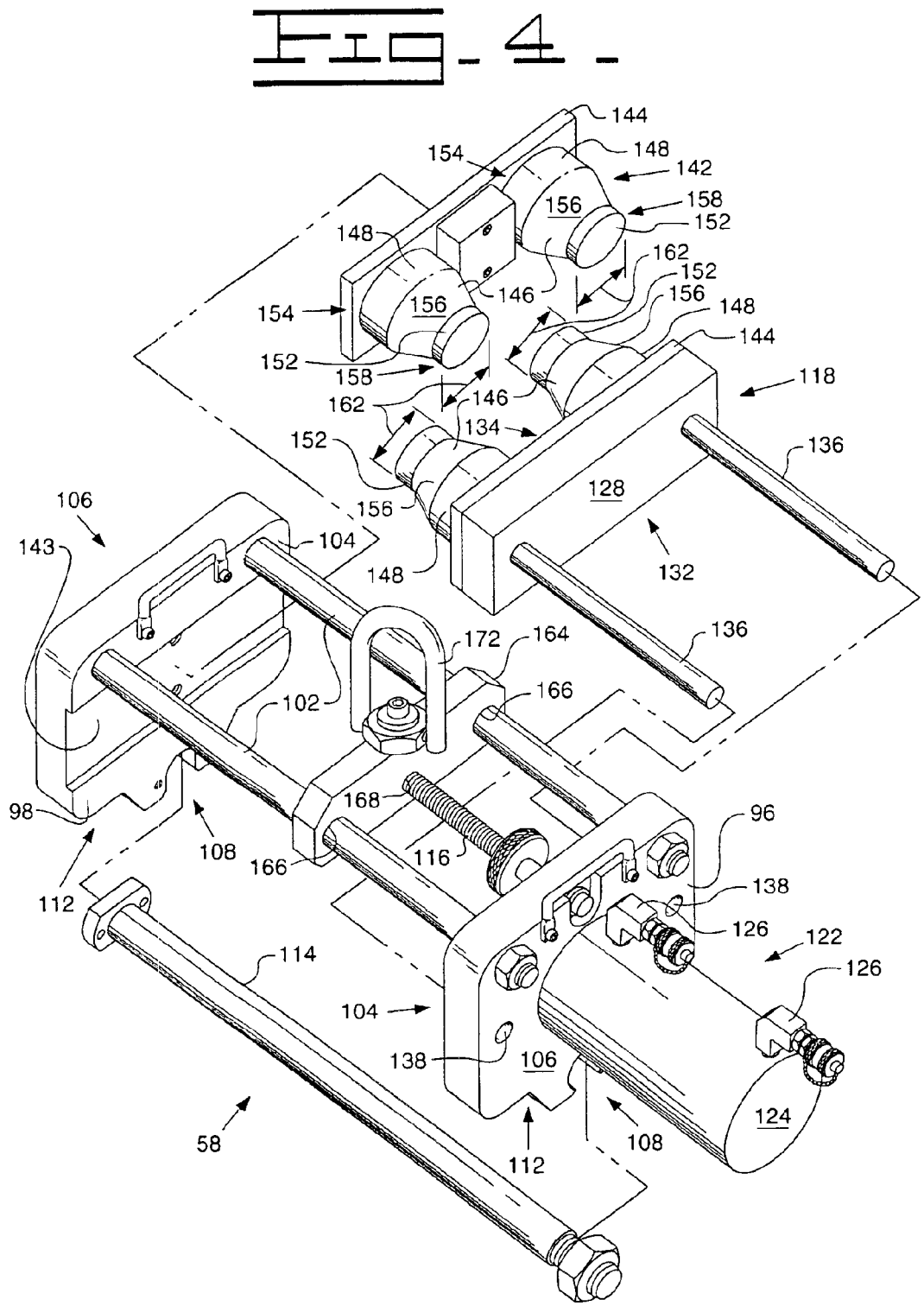

METHOD AND APPARATUS FOR INSTALLING LINKS ON AN ENDLESS TRACK CHAIN

TECHNICAL FIELD

This invention relates generally to a track chain assembly for track driven machine and more specifically to a method and apparatus for assembling and disassembling the track chain.

BACKGROUND

Track type work machines typically have an undercarriage for moving the machine along the ground. The under carriage includes track chain assembly encircling a frame, a sprocket, an idler. During use of the work machine the sprocket rotates, engaging the track chain assembly, thereby causing the track chain assembly to rotate around a path defined by the sprocket and the idler. The rotation of the track chain assembly causes the work machine to be propelled over the ground so as to perform various work functions.

Track chain assemblies generally include a pair of parallel chains, with each parallel chain being made up of a series of track links. Track chain assemblies further include a series of track pins between and connected to the parallel chains. Typical track chain assemblies include two ends that are coupled together using a two piece master link to form a continuous chain or loop. An example of a typical master link is illustrated in U.S. Pat. No. 4,636,014 to Dennison et al. The track pins and the track links cooperate to form a number of track joints which allow the necessary movement of the track pins relative to the track links during use of the track chain assembly, for example, when the track chain assembly rotates about the sprocket and the idler.

The cost of the master link is considerably higher than the cost of the other track links. The reason for the higher cost is fewer master links are produced, special forging tools are required and the design is more complicated than a typical track link.

Through normal use, the track chain assembly may require service or replacement of one or more of the track joints. To facilitate this servicing of the track chain assembly, the master link must be disassembled and the track chain moved to a specially equipped repair shop. Track shops use a track press to disassemble the track chain, replace damaged parts and reassemble the chain. An example of a track press can be found in U.S. Pat. No. 5,214,908 to Livesay et al. Track presses are large stationary machines that are extremely expensive to own and operate. Track presses are typically housed in a separate building, further increasing the expense of ownership. To repair a track assembly a large amount of down time, often days, is required. The track assembly must first be removed from a work machine, then transported to a track shop for repair and then transported back to the machine and reinstalled. This down time cost machine owners money for the repair and loss of use of the machine.

What is needed therefore are track chain repair tools which overcome one or more of the above-mentioned drawbacks.

SUMMARY OF THE INVENTION

The present invention provides a method of installing a track link on a track assembly of a work machine. The method includes delivering an assembly tool to a track assembly or a track type work machine. The assembly tool includes a body having a first link contact tool and a second link contact tool. The second link contact tool is spaced away from the first link contact tool and is moveable toward said second contact tool. A first and second track are aligned and the assembly tool is positioned relative to the first and second track pin. The track link is positioned on one of the first and second link contact tools, the first link contact tool is then moved toward the second link contact tool until the track link is fully engaged with the pair of track pins.

In another embodiment of the present invention a track assembly tool for installing links on a track chain is disclosed. The assembly tool includes a body portion having a first link contact tool moveably attached to body. A second link contact portion is spaced away from the first contact tool. A drive member is attached to the body and second link contact tool. The drive member is adapted to move the first link contact tool toward the second contact tool.

BRIEF DESCRIPTION OF THE DRAWINGS

FIG. 2 is a top view of a partially exploded view of a track chain as used on the work machine of FIG. 1.

FIG. 3 is a perspective view of a "V" block used in conjunction with the assembly tool of the present invention.

FIG. 3a is an exploded perspective view of the "V" block of FIG. 3.

FIG. 4 is an exploded perspective view of the assembly tool of the present invention.

DETAILED DESCRIPTION

Figure 1:
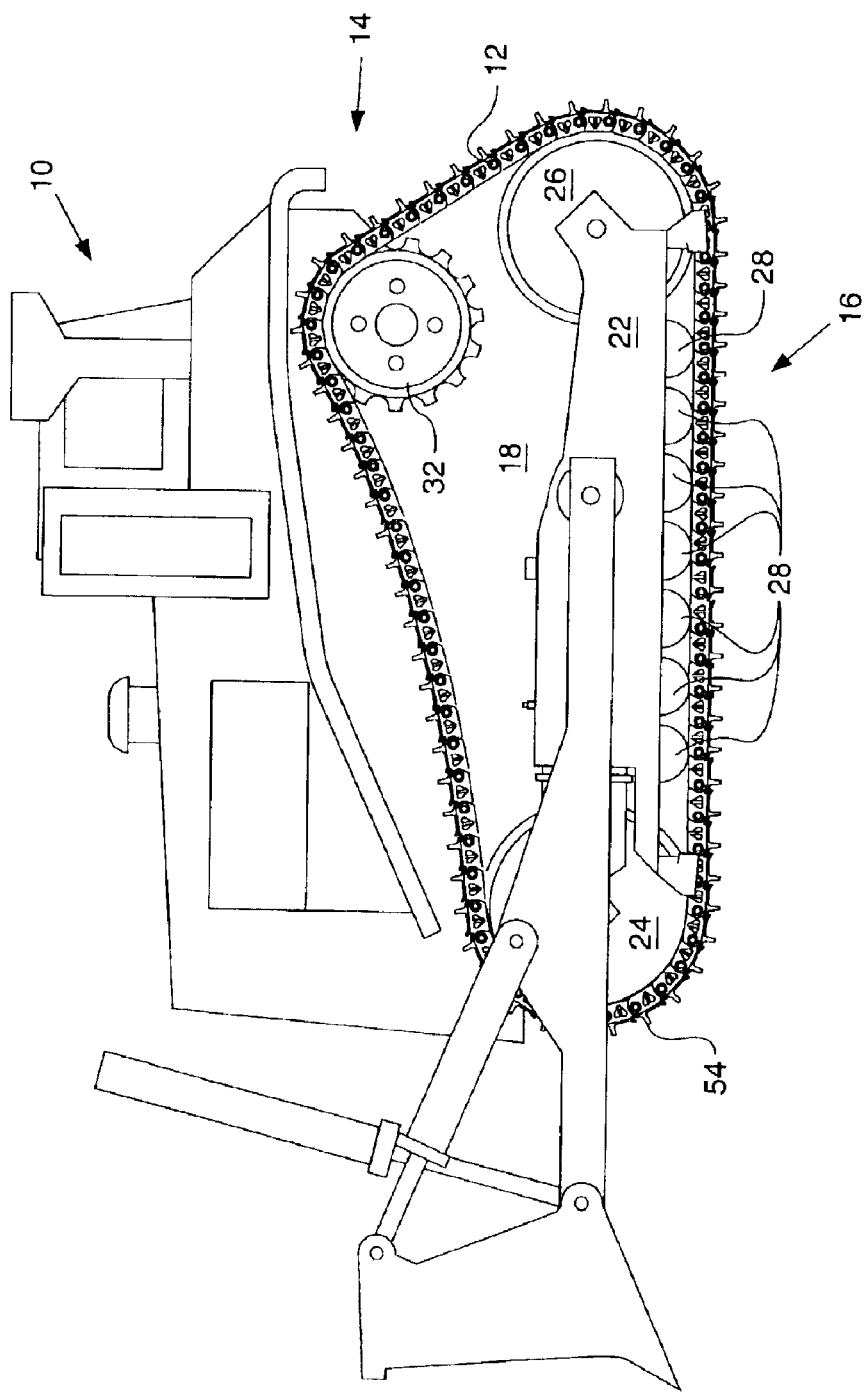
FIG. 1 illustrates a side elevational view of a work machine having a track chain assembly for moving the work machine along the ground.

Referring to FIG. 1, a track type tractor 10 is illustrated, it should be noted that the present invention may be used on any work machine having an endless track assembly 12. The track type tractor includes a frame shown generally as 14 and an engine (not shown) mounted on the frame 14. An undercarriage assembly 16 having a right side (not shown) and a left side 18 is attached to the frame 14. The undercarriage assembly 16 includes a frame rail 22 having a front idler 24 and a rear idler 26 mounted thereupon. Pluralities of bogie wheels 28 are positioned below the frame rail 22 to support the machine on the track assembly 12. A drive sprocket 32 is positioned above the undercarriage 16 and is drivingly coupled to the engine. The track assembly 12 encompasses the undercarriage assembly 16 and engages the drive sprocket 32, front idler 24, rear idler 26, and bogie wheels 28.

Referring now to FIG. 2, the track assembly 12 generally includes a plurality of pairs of track joint assemblies 34 pivotally connected together by a pair of outer track links 36. Each track joint assembly 34 includes a pair of inner track links 38 disposed parallel to one another. Each inner track link 38 defines a first aperture 42 and a second aperture 44. The first and second apertures 42, 44 are configured to receive and provide an interference fit with a track pin 46. The outer track links 36 also define first and second apertures 42, 44 that receive a track pin 46. The track pins 46 and the entrained inner and outer track links 36, 38 cooperate to form the track assembly 12. Each of the inner and outer track links 36, 38 also define a pair of bolt holes 48. Each bolt hole 48 receives one of a plurality of bolts (not shown) that attaches a track shoe (not shown) to track assembly 12.

Referring now to FIGS. 3 and 3a, a positioning, or "V" block 56 adapted for use with an assembly tool 58 (shown in FIG. 5) of the present invention is shown. The "V" block 56 includes a rigid main member 62 having a first pin engagement portion 64 and a second pin engagement portion 66. The "V" block 56 as illustrated shows the main member 62 as having a top portion 68 and a bottom portion 72. The top portion 68 includes a top surface 74a, a bottom surface 76a and a pair of sides 84a. The top portion 68 includes a raised portion 78 having a pair of threaded holes 82 disposed in a side therein. The threaded holes 82 are configured to receive a pair of support rods (not shown) that engage a disassembly tool (not shown). The bottom portion 72 includes a top surface 74b, a bottom surface 76b and a pair of sides 84b. The bottom surface 76a of the top portion 68 is configured to engage the top surface 74b of the bottom portion 72. The top and bottom portions 68, 72 of the "V" block 56 can be fastened together using a locking pin 86 and a pair of bolts 92.

The first and second pin engagement portions 64, 66 are defined in the bottom surface 76a of the top portion 68 and the top surface 74b of the bottom portion 72 respectively. The pin engagement portions 64, 66 are spaced apart from one another, a distance 94 substantially equal to that of the pitch 45 of the outer track link 36. The pin engagement portions 64, 66 are illustrated having a "V" shape. When the top and bottom portions 68, 72 are aligned, the pin engagement portions 64, 66 form a diamond shape. When the locking pin 86 and pair of bolts 92 fasten the top portion 68 and bottom portion 72 together, the diamond shape of the pin engagement portions 64, 66 act to position each track pin 46 for the outer track link 36 to be installed.

Figure 5:
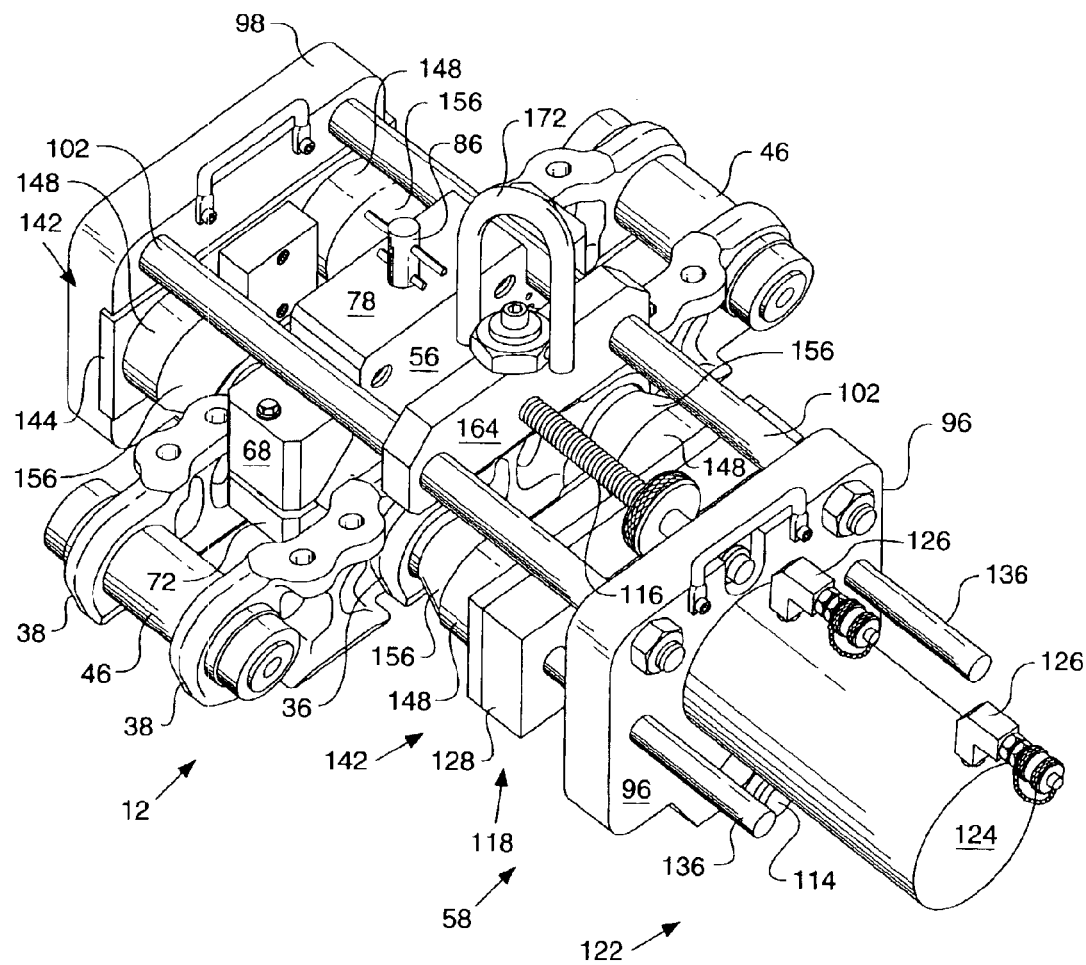
FIG. 5 is a perspective view of the assembly tool and the "V" block of the present invention in cooperating engagement with a track chain.

Referring now to FIGS. 4 and 5, the assembly tool includes a first and second body portion 96, 98. The first and second body portions 96, 98 are substantially rectangular steel plates spaced apart from one and other by a pair of main support rods 102. The first and second body portions 96, 98 include an inner side surface 104 and an outer side surface 106. A "U" shaped notch 108 is formed into a bottom peripheral edge 112 of the first and second body portions 96, 98. The "U" shaped notch 108 is configured to receive an auxiliary support rod 114. The auxiliary support rod 114 is adapted for easy removal and installation on the assembly tool 58. The auxiliary support rod 114 provides structural support between the first and second body portions 96, 98 during the assembly process.

The first body portion 96 is additionally configured to receive an adjusting screw 116, a tool guide 118 and a drive member 122. The drive member 122 is preferably a hydraulic ram 124 although a pneumatic ram, ball screw mechanism or any conventional linear drive mechanism may be used. The hydraulic ram 124 attaches to the outer side surface 106 of the first body portion 96 and aligns with a bore (not shown) that extends from the outer side surface 106 to the inner side surface 104. The hydraulic ram 124 includes a piston (not shown) that aligns with the tool guide 118. Extension of the hydraulic ram 124 causes movement of the tool guide 118 toward the second body portion 98. The hydraulic ram 124 includes a pair of fluid couplings 126. The fluid couplings 126 are adapted to attach to a hydraulic power source (not shown) for actuating the hydraulic ram 124. The power source is conventional in nature and may be either portable or stationary.

The tool guide 118 includes a rectangular steel support member 128 having first side surface 132 and second side surface 134. A pair of guide rods 136 extend from the first side surface 132 and are configured to align with a pair of guide holes 138 disposed in the first body portion 96. The pair of guide holes 138 extend from the inner side surface 104 to the outer surface 106. One of a pair of contact tools 142 is configured to fasten to the second side surface 134 of the tool guide 118. The other of the pair of contact tools 142 is configured to attach to a groove 143 in the inner side surface 104 of the second body portion 98.

Each one of the pair of contact tools 142 is substantially a mirror image of the other. Each of the pair of contact tools 142 includes a base plate 144 and a pair of hubs 146 attached to the base plate 144. The base plate 144 of one of the pair of the contact tools 142 is bolted to the tool guide 118. Each of the pair of hubs 146 is fastened to the base plate 144 and spaced a predetermined distance from the other of the pair of hubs 146, the predetermined distance is related to the pitch 45 of the outer track link 36. Different contact tools 142 are configured to be used for assembling track assemblies 12 of different pitch 45. Each hub 146 includes a main member 148 and spring-loaded secondary member 152. The main member 148 is a cylindrical steel member having a first end 154, a tapered portion 156 and a second end 158. A bore (not shown) is defined in the main member 148 and extends from the second end 158 toward the first end 154. The bore is adapted to receive the spring-loaded secondary member 152. The secondary member 152 is cylindrical in shape and has an outside diameter 162 slightly smaller than the inside diameter of the first and second apertures 42, 44 of the outer track link 36. The secondary member 152 is configured to be slideably positioned in the bore of the main member 148, at least one spring (not shown) is positioned between the bore and the secondary member 152. When assembled each of the pair of contact tools 142 may receive an outer track link 36 having its first and second apertures 42, 44 positioned on the secondary members 152.

An adjustable lifting bar 164 is provided on the assembly tool 58. The lifting bar 164 is a steel member having a pair of bores 166 configured to slidingly engage the pair of support rods 102. A threaded hole 168 is provided between the pair of bores 166 and configured to engage the adjusting screw 116 of the first body portion 96. A lifting eye 172 is also attached to the lifting bar 164. Rotation of the adjusting screw 116 causes the lifting bar 164 to be moved along the main support rods 102. The lifting bar 164 can be properly positioned to balance the assembly tool 58 as it is suspended from a hoist (not shown).

INDUSTRIAL APPLICABILITY

In operation outer track links 36 are installed on a pair of track joint assemblies 34 by first positioning on a pair of track pins 46 the "V" block 56. The assembly tool 58 is shown with the main support rods 102 positioned on either side of the raised portion 78 of the "V" block 56. A pair of outer track links 36 are illustrated in position on the secondary members 152 of the contact tools 142. It should be noted that the assembly tool 58 may be used to install a single outer track link 36 or a pair of track links 36 at the same time.

In operation the top portion 68 and the bottom portion 72 of the "V" block 56 align the track joint assemblies 34. The track pins 46 that will receive the outer track links 36 engage the first and second pin engagement portions 64, 66. The top and bottom portions 68, 72 of the "V" block 56 are first locked together using the locking pin 86. The pair of bolts 92 are next used to clamp the top and bottom portions 68, 72 together, simultaneously aligning the track pins 46 for installation of the outer track links 36.

With the auxiliary support rod 114 removed from the "U" shaped notches 108 and the hydraulic ram 124 in a retracted position, the outer track link 36 may be positioned on one or both contact tools 142. The assembly tool 58 may then be lifted and positioned so that the main support rods 102 engage the top portion 68 on either side of the raised portion 78 of the "V" block 56. Using the adjusting screw 116, the lifting bar 164 may be moved along the main support rods 102 to balance the assembly tool 58, thereby aligning the outer track links 36 with the appropriate track pins 46. The auxiliary support rod 114 may now be positioned and fastened into the "U" shaped notches 108.

With the ram 124 connected to a power source, the ram 124 may be extended, causing the tool guide 118 to be moved toward the "V" block 56. As the tool guide 118 and outer track link 36 begin to engage the track pins 46, the second body portion 98, contact tool 142 and other outer track link 36 are pulled toward the track pins 46. Continued extension of the hydraulic ram 124 causes the spring-loaded secondary members 152 to be pushed into the main members 148 of the contact tool 142. The tapered portions 156 next contact the first and second apertures 42, 44 of the outer track links 36. When each outer track link 36 is properly pressed onto the track pins 46, the hydraulic ram 124 is retracted and the auxiliary support rod 114 removed from the assembly tool 58. The assembly tool 58 and "V" block 56 may then be removed from the track assembly 12 and the track shoes (not shown) reinstalled.

The present invention provides a compact, portable, and low cost assembly tool 58 for repairing track assemblies 12. Using the present invention track assemblies 12 may be repaired at a customer site without requiring the extra time to transport the track assembly 12 to and from a specialized repair shop.

What is claimed is:

1. A portable track assembly tool for installing links on a track chain, said assembly tool comprising:
    a body portion having a pair of main support rods extending therefrom;
    a first link contact tool being moveably attached to said body portion and including a pair of hubs;
    a second link contact tool including a pair of hubs, being spaced a predetermined distance from said first link contact tool, said pair of main support rods overlaying said first and second link contact tools and the second link contact tool being non-movably securedly positioned in relation to said pair of main support rods; and
    a drive member attached to said body and said first link contact tool, said drive member being adapted to move said first link contact tool in a first direction toward said second link contact tool.

2. The track assembly tool of claim 1, wherein said drive member is a hydraulic cylinder.

3. The track assembly tool of claim 1, wherein said drive member is a pneumatic cylinder.

4. The track assembly tool of claim 1, wherein said assembly tool includes a hook, said hook being adapted to connect to a hoist for lifting said tool into a working position relative to a track assembly.

5. The track assembly tool of claim 1, further including a positioning block adapted to engage a first and a second track pin of a track assembly, said positioning block including;
    a first pin engagement portion, said first pin engagement portion having a locking member for securing said first pin engagement portion to said first track pin;
    a second pin engagement portion, said second pin engagement portion having a locking member for securing said second pin engagement portion to said second track pin; and
    a predetermined distance being defined from a center point of said first pin engagement portion to a center point of said second pin engagement portion.

6. The track assembly tool of claim 5 wherein said predetermined distance is substantially equal to a distance between a center point of a first track pin of a track joint and a center point of a second track pin of said track joint.

7. The track assembly tool of claim 6 wherein said positioning block includes a top member and a bottom member, one of said top and bottom members including a fastening arrangement for attaching said top and bottom members together.

8. The track assembly tool of claim 5 wherein the positioning block includes a raised portion having a predetermined width, said raised portion being operable in use to position the main support rods relative to said positioning block.

9. The track assembly tool of claim 1 wherein the pair of main support rods are generally aligned parallel to each other and spaced at a predetermined distance from each other.

10. The track assembly tool of claim 1 including a removable support member oepratively connected between the body portion and the second link contact tool.

11. The track assembly tool of claim 10 wherein the removable support member is spaced from the pair of main support rods and aligned generally parallel therewith.

* * * * *